(12) United States Patent
Chen

(10) Patent No.: US 7,555,178 B2
(45) Date of Patent: Jun. 30, 2009

(54) PERIODIC OPTICAL FILTER

(75) Inventor: Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/781,021

(22) Filed: Jul. 20, 2007

(65) Prior Publication Data

US 2009/0022454 A1 Jan. 22, 2009

(51) Int. Cl.
*G02B 6/26* (2006.01)
(52) U.S. Cl. .............................. 385/27; 385/24; 398/82
(58) Field of Classification Search ...................... None
See application file for complete search history.

(56) References Cited

U.S. PATENT DOCUMENTS

| | | | |
|---|---|---|---|
| 5,838,851 A * | 11/1998 | Wisseman et al. | ............ 385/32 |
| 6,263,126 B1 * | 7/2001 | Cao | ............................ 385/24 |
| 6,681,065 B1 * | 1/2004 | Minasian et al. | ............... 385/27 |
| 6,801,721 B1 * | 10/2004 | Madsen | ........................ 398/147 |
| 6,909,531 B2 | 6/2005 | Frignac et al. | |
| 2004/0136647 A1 * | 7/2004 | Mizuno et al. | ................ 385/24 |

FOREIGN PATENT DOCUMENTS

EP  1 231 490 A2  2/2002

OTHER PUBLICATIONS

R. Slavik et al. All-fiber periodic filters for DWDM using a cascade of FIR and IIR lattice filters. IEEE Photonics Technology Letters 16:2:497, Feb. 2004.*

M. Kuznetsov. Cascaded coupler Mach-Zehnder channel dropping filters for wavelength-division-multiplexed optical systems. Journal of Lightwave Technology 12:2:226, Feb. 1994.*
S. Cao, J. Chen, J. N. Damask, C. R. Doerr, L. Guiziou, G. Harvey, Y. Hibino, H. Li, S. Suzuki, K. —Y. Wu and P. Xie, "Interleaver Technology: Comparisons and Applications Requirements," *Formal Submission, JND ver 3.0*, 062503, revised 091503, OFC'03 Interleaver Workshop Review Paper, pp. 1-9, Sep. 15, 2003.
K. Jinguji and M. Oguma, "Optical Half-Band Filters," *Journal of Lightwave Technology*, vol. 18, No. 2, Feb. 2000, pp. 252-259.
"Reconfigurable optical add-drop multiplexer" and Optical add-drop multiplexer, *Wikipedia, the free encyclopedia*, http://en.wikipedia.org, 3 pages, Jun. 4, 2007.
Q. J. Wang, Y. Zhang, and Y. C. Soh, "Design of 100/300 Ghz optical interleaver with IIR architectures," *Optics Express 2643*, Apr. 4, 2005/vol. 13, No. 7, 10 pages.

* cited by examiner

*Primary Examiner*—Sung H Pak
*Assistant Examiner*—Mike Stahl
(74) *Attorney, Agent, or Firm*—W. Douglas Carothers, Jr.; David L. Soltz

(57) ABSTRACT

A periodic optical filter for interleaving a plurality of optical signals to provide a multiplexed signal for transmission over an optical fiber is disclosed. The periodic optical filter includes a first optical filter constructed to receive at least two optical signals through an input port to provide at least one filtered optical signal. The periodic optical filter also includes a second optical filter, in communication with the first optical filter, constructed to receive the filtered optical signal from the first optical filter through an intermediate port to provide a multiplexed signal for transmission through an output port. At least one of the optical filters includes an infinite-impulse response filter and at least one of the optical filters includes a finite-impulse response filter. Methods of fabrication and methods of use including the periodic optical filter are disclosed.

14 Claims, 7 Drawing Sheets

PERIODIC OPTICAL FILTER

CROSS-REFERENCE TO RELATED APPLICATIONS

Not Applicable.

STATEMENT REGARDING FEDERALLY SPONSORED RESEARCH OR DEVELOPMENT

Not Applicable.
THE NAMES OF THE PARTIES TO A JOINT RESEARCH AGREEMENT
Not Applicable.

REFERENCE TO A "SEQUENCE LISTING ," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5))

Not Applicable.

BACKGROUND OF THE INVENTION

Planar light-wave circuits, also known as planar light-wave chips (PLCs), are optical devices wherein optical components and networks are disposed monolithically within a stack or stacks of optical thin films supported by a common mechanical substrate such as a semiconductor or glass wafer. PLCs are typically designed to provide specific transport or routing functions for use within fiber-optic communications networks. These networks are distributed over a multitude of geographically-dispersed terminals and commonly include transport between terminals via single-mode optical fibers.

Wavelength-division multiplexing (WDM) is a commonly employed technology within telecommunication systems that provides transmission of multiple optical signals on a single optical fiber by using different wavelengths to carry different signals. In the WDM system, each optical carrier signal is transmitted within a narrow wavelength band centered around a center wavelength. Such a band is commonly referred to as an optical channel with each channel characterized by a single center wavelength ($\lambda_x$).

The WDM system uses an interleaver to join the optical carrier signals together for transmission over the single optical fiber while a de-interleaver is used to split the optical carrier signals apart. The interleaver takes the optical signal having different channels and combines them for transmission over the single optical fiber. The de-interleaver performs the reverse application and splits the signal into multiple optical signals. In this regard, WDM systems allow capacity expansion of the network without having to lay out more optical fibers since capacity of a given link can be expanded by simply upgrading the interleavers and de-interleavers.

Optical filters serve as components in WDM systems that provide the signal processing functions needing in interleaving/de-interleaving, balancing of signal power, adding and/or dropping of channels, and the like.

The design goal of an optical filter for a WDM system application is to provide a passband having a wide, nearly flat top with minimum insertion loss and rapid rolloff on the band edges all the while minimizing chromatic dispersion across the passband.

One of the current practices within the art to minimize the amount of chromatic dispersion is through the use of two or more FIR filters cascaded together. By designing complimentary FIR filters with similar amplitude responses and opposite delay responses, chromatic dispersion is minimized. See, S. Cao, et al. "Interleaver Technology: Comparisons and Applications Requirements", J. Lightwave Technol. Vol. 22, 281-289 (2004); See, U.S. Pat. No. 6,735,358 entitled, "Optical Multiplexer and Optical Demultiplexer". However, the passbands of FIR filters do not provide the same desired characteristics of the wide, nearly flat top passband seen through the use of IIR filters.

Infinite-impulse response filters (IIR filters) are also currently being practiced in the art to provide the wide, nearly flat top passbands with high extinction ratios. See, Jinguji, K. et al. "Optical Half-Band Filter", J. Lightwave Technol. Vol. 18, 252-259 (2000); See Wang, Qi, et al. "Design of 100/300 GHz optical interleaver with IIR architectures", Optics Express, Vol. 13, (March 2005). However, there is difficulty in minimizing the chromatic dispersion across the passband.

Accordingly, an optical filter arrangement and method of using the optical filter arrangement to provide the desired passband characteristics while minimizing chromatic dispersion, as compared with currently-available technologies, will provide a commercially and industrially marketable product currently needed within the art.

BRIEF SUMMARY OF THE INVENTION

In one embodiment, the present invention is related to a periodic optical filter for interleaving a plurality of optical signals to provide a multiplexed signal for transmission over an optical fiber. In general, the periodic filter is provided with at least two optical filters. At least one of the optical filters includes an infinite-impulse response filter and one of the optical filters includes a finite-impulse response filter. For example, the infinite-impulse response filter can be a half-band filter and the finite-impulse response filter can be a Mach-Zehnder interferometer. The filters are cascaded in series or in parallel configuration.

In another embodiment, the present invention is related to a periodic optical filter for de-interleaving a multiplexed signal to provide a plurality of optical signals for transmission over multiple optical fibers. In general, the periodic filter includes at least one finite-impulse response filter and at least one infinite-impulse response filter. The finite-impulse response filter includes an input port for receiving a multiplexed signal and provides a filtered signal to the infinite-impulse response filter. The infinite-impulse response filter receives the filtered signal and provides a multiplexed signal to an optical fiber.

BRIEF DESCRIPTION OF THE SEVERAL VIEWS OF THE DRAWING

So the above-recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally-effective embodiments.

DETAILED DESCRIPTION OF THE INVENTION

Figure 1A:
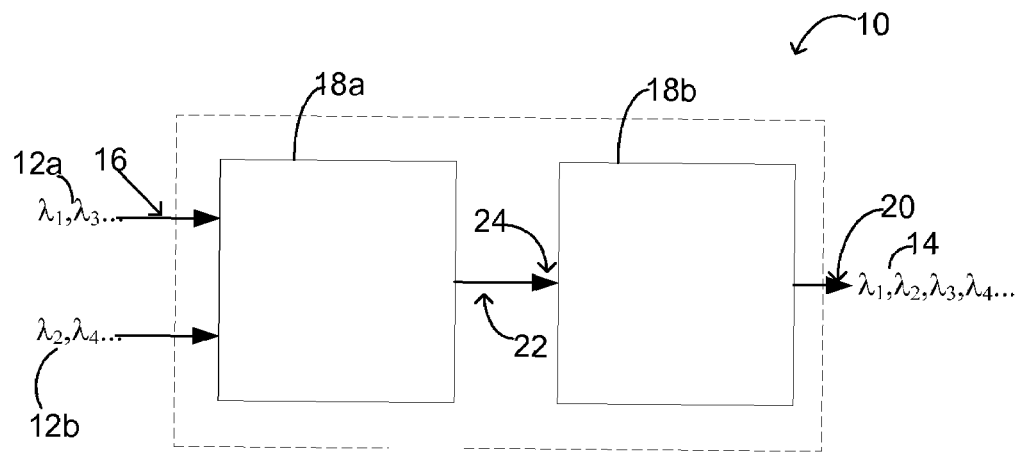
FIG. 1A is a schematic block diagram of an exemplary periodic optical filter for interleaving optical signals to provide a wavelength division multiplexed signal in accordance with the present invention.

Embodiments of the invention are shown in the above-identified Figures and described in detail below. In describing the embodiments, like or identical reference numerals are used to identify common or similar elements. The Figures are not necessarily to scale and certain features and certain views of the Figures may be shown exaggerated in scale or in schematic in the interest of clarity and conciseness.

Referring now to the drawings and in particular to FIG. 1A, shown therein and designated by a reference numeral 10 is a schematic block diagram of a periodic optical filter for interleaving a plurality of optical signals 12a and 12b to provide a wavelength division multiplexed signal 14 for transmission over an optical fiber in accordance with the invention. In general, the periodic optical filter 10 receives optical signals 12 through an input port 16, filters optical signals 12 using at least two optical filters 18a and 18b, and provides the resulting wavelength division multiplexed signal 14 through an output port 20.

As previously discussed, optical signals 12a and 12b each contain a plurality of channels with center channel wavelengths $\lambda_x$. For example, optical signal 12a contains a plurality of channels with center channel wavelengths $\lambda_1$, $\lambda_3$, $\lambda_5$, $\lambda_7$, ... Optical signal 12b contains a plurality of channels with center channel wavelengths $\lambda_2$, $\lambda_4$, $\lambda_6$, $\lambda_8$, ... The periodic optical filter 10 filters the optical signals 12a and 12b by interleaving the optical signals to form the resulting multiplexed signal 14 having center channel wavelengths $\lambda_1$, $\lambda_2$, $\lambda_3$, $\lambda_4$, $\lambda_5$, $\lambda_6$, ...

Generally within the periodic filter 10, optical filter 18a provides a first filtering function on the optical signals 12a and 12b transmitting at least one filtered optical signal 22 to optical filter 18b through an intermediate port 24. Optical filter 18b provides a second filtering function on the filtered optical signal 22 and provides the resulting multiplexed signal 14 at an output port 20. The design and placement of optical filters 18a and 18b minimizes chromatic dispersion of the multiplexed signal 14. That is each of the optical filters 18a and 18b introduces chromatic dispersion into the optical signals 12. However, the signs of the chromatic dispersion introduced by the optical filters 18a and 18b are opposite and approximately equal so that the summation of the chromatic dispersion is nearly zero. Preferably, compensated rages are on the order of 0 to 2000 psec/nm.

Figure 1B:
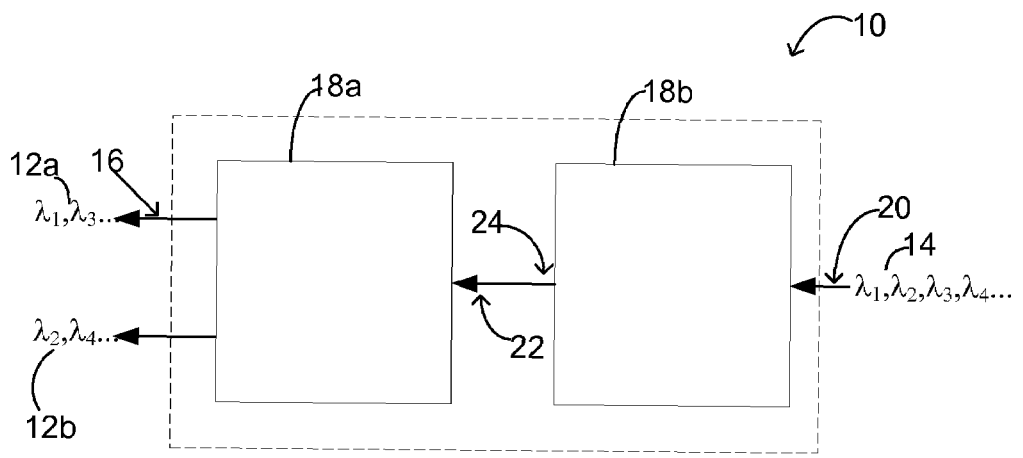
FIG. 1B is a schematic block diagram of an exemplary periodic optical filter for de-interleaving multiplexed optical signals in accordance with the present invention.

The periodic optical filter 10 may also be used in the reverse as illustrated in FIG. 1B. That is, if the multiplexed signal 14 is input into the output port 20 of the optical filter 18b, the periodic optical filter 10 will output a plurality of optical signals 12a and 12b for transmission over multiple optical fibers. This reversibility for de-interleaving the multiplexed signal 14 will apply to the embodiments of the present invention.

Referring now to FIGS. 2A-2D, the optical filters 18 within the periodic optical filter 10 are selected such that at least one of the optical filters 18a and/or 18b include an infinite-impulse response filter (IIR filter) 26 and at least one of the optical filters 18a and/or 18b include a finite-impulse response filter (FIR filter) 28. For example, optical filters 18 may contain (a) one IIR filter 26 and/or FIR filter, (b) multiple IIR filters 26 and/or multiple FIR filters 28, and/or (c) IIR filters or FIR filters cascaded in parallel. Preferably, each optical filter 18a and/or 18b contains either IIR filters 26 or FIR filters 28 as illustrated in FIGS. 2A-2D. However, combinations of IIR filters 26 and FIR filters 28 are contemplated as long as, in general, the periodic optical filter 10 includes at least one IIR filter 26 and at least one FIR filter 28 in order to minimize chromatic dispersion as will be discussed in more detail below.

Figure 2A:
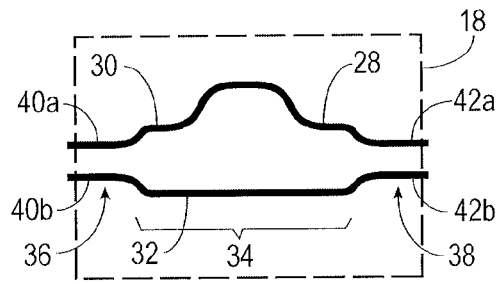
FIGS. 2A-2D are schematic diagrams of exemplary optical filters for use in the periodic optical filters of FIGS. 1A and 1B.

FIG. 2A illustrates one version of the optical filter 18b suitable for use in the periodic optical filter 10 having one FIR filter 28. Various examples of suitable FIR filters 28 for use within the periodic optical filter 10 are discussed in the art. See, "Interleaver Technology: Comparisons and Applications Requirements," Chen, S. et al. *Interleaver Workshop Review Paper,* (OFC, 2003), and U.S. Pat. No. 6,909,531 entitled "Optical (De-)lnterleaver and Method of (De-)interleaving Optical Signals," the entire contents of which are hereby expressly incorporated by reference. The FIR filter may, for example, be based on a Mach-Zehnder interferometer, Fabry-Perot interferometer, or other similar interferometer.

Generally, the FIR filter 28 includes a first arm 30 and a second arm 32 such that the combination of the first arm 30 and the second arm 32 forms an interferometric unit cell 34. Preferably, the first arm 30 and the second arm 32 are asymmetric and have differing path lengths. The path length is the geometric length of the path that light follows through the system. For example, in FIG. 2A, the path length of the first arm 30 is greater than the path length of the second arm 32. Differing the path length imparts a differential delay between the two arms providing a filtering function. As is well known in the art, design considerations on the path length of the first arm 30 and the second arm 32 provide a mechanism for altering free spectral range of the channels in the resulting multiplexed signal 14.

The FIR filter 28 includes a first end 36 and a second end 38. The first end 36 of the FIR filter 28 is constructed to form two input ports 40a and 40b. The second end 38 of the FIR filter 28 is constructed to form two output ports 42a and 42b. Signals are transmitted into the input ports 40a and/or 40b, filtered in the interferometric unit cell 34, and provided to the output ports 42a and/or 42b. The signals apply to both optical signals 12 and filtered optical signals 22 as it is dependent upon the placement of the optical filter 18 within the periodic optical filter 10 whether the signal inputted into the optical filter 18 is the optical signals 12 or the filtered optical signals 22.

Figure 2B:
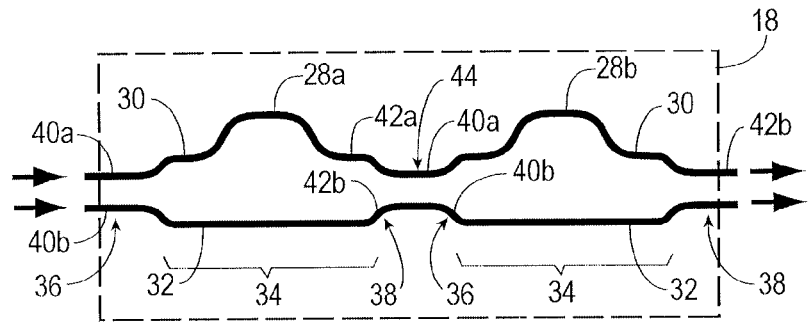

As illustrated in FIG. 2B, FIR filters 28 (and/or IIR filters) can be coupled together to form a chain of two or more FIR filters 28a and 28b. The output ports 42a and 42b of FIR filter 28a are optically coupled to the input ports 40a and 40b of FIR filter 28b with a directional coupler 44.

Figure 2C:
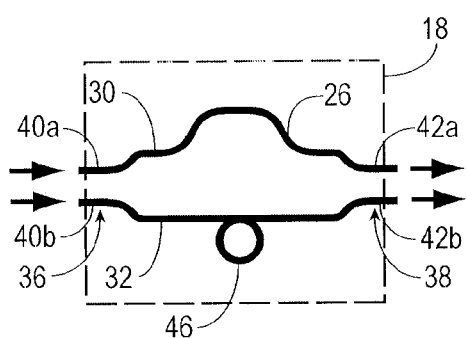

FIG. 2C illustrates another version of the optical filters 18a or 18b suitable for use in the periodic optical filter 10 having one IIR filter 26. Various examples of suitable IIR filters 26 for use in the periodic optical filter 10 are discussed in the art.; Jinguji, K. et al. "Optical Half-Band Filter", J. Lightwave Technol. Vol. 18, 252-259 (2000); See Wang, Qi, et al. "Design of 100/300 GHz optical interleaver with IIR architectures", Optics Express, Vol. 13, (March 2005).; the entire contents of which are hereby expressly incorporated by reference regarding structures for suitable IIR filters. For example, the IIR filter 26 may be based on half-band interferometers known in the art.

Generally, the IIR filter 26 is structurally similar to the FIR filter 28 discussed above. Similar to the FIR filter, the IIR filter 26 includes the first end 36 forming two input ports 40a and 40b and the second end 38 forming two output ports 42a and 42b. Signals are transmitted into the IIR input ports 40a and/or 40b, filtered in the interferometric unit cell 32, and provided to the IIR output ports 42a and/or 42b. The signals apply to both optical signals 12 and filtered optical signals 22 as it is dependent upon the placement of the optical filter 18 within the periodic optical filter 10 whether the signal inputted into the optical filter 18 is the optical signals 12 or the filtered optical signals 22.

In addition to the structures similar to the FIR filter 28, the IIR filter 26 also preferably includes the addition of one or more resonator 46 optically coupled to the first arm 30 and/or the second arm 32. For example, as illustrated in FIG. 2B, the IIR filter 26 includes the resonator 46 optically coupled to the second arm 32. Additionally, multiple resonators 46 may be attached to both the first arm 30 and the second arm 32. The size and dimensions of each resonator 46 varies and is based on the needs and use of the periodic optical filter 10 and/or simplicity of design considerations.

Figure 2D:
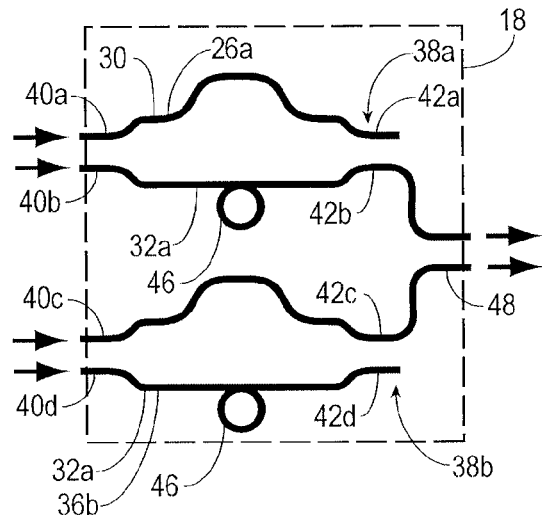

FIG. 2D illustrates another version of the optical filter 18a or 18b having two IIR filters 26 cascaded in parallel providing filtered optical signals. The structure and function of the parallel cascaded IIR filters 26 is similar to the multiple FIR filters 28 in series discussed above. Similar to the FIR filters, each IIR filter 26a and 26b includes the first end 36a and 36b forming input ports 40a and 40b and input ports 40c and 40d, respectively. Each IIR filter 26a and 26b also includes the second end 38a and 38b forming output ports 42a and 42b and output ports 42c and 42d. In this version of the optical filters 18a or 18b, signals are transmitted into the IIR input ports 40a, 40b, 40c, and/or 40d and filtered in the interferometric unit cells 32a and 32b. The resulting signals from the interferometric unit cells 32a and 32b are provided through a multiplexing branch 48 formed by IIR output ports 42b and 42c. The signals apply to both optical signals 12 and filtered optical signals 22 as it is dependent upon the placement of the optical filter 18 within the periodic optical filter 10 whether the signal inputted into the optical filter 18 is the optical signals 12 or the filtered optical signals 22.

An intermediate device, such as a signal processing system, variable optical attenuators (VOAs), switches, other filters, optical taps, and/or the like can be placed between the IIR filters 26 and/or FIR filters 28 based on the needs of the designer without deterring from the teachings of the invention. Additionally, an intermediate device, such as a signal processing system, VOAs, switches, other filters, optical taps, and/or the like, can be placed between the optical filters 18a and 18b without deterring from the teachings of the invention.

As previously discussed, both IIR filters 26 and FIR filters 28 have been used in the art separately for interleaving optical signals 12. Both the IIR filter 26 and the FIR filter 28 have desired characteristics for providing multiplexed signals 14 (or in the reverse, de-multiplexed signals). For example, IIR filters 26 are commonly used for their desired characteristics of high extinction ratios and wide bandwidths. However, IIR filters 26 generally cause an accumulation of chromatic dispersion if solely used in the interleaver or de-interleaver design.

Figure 3A:
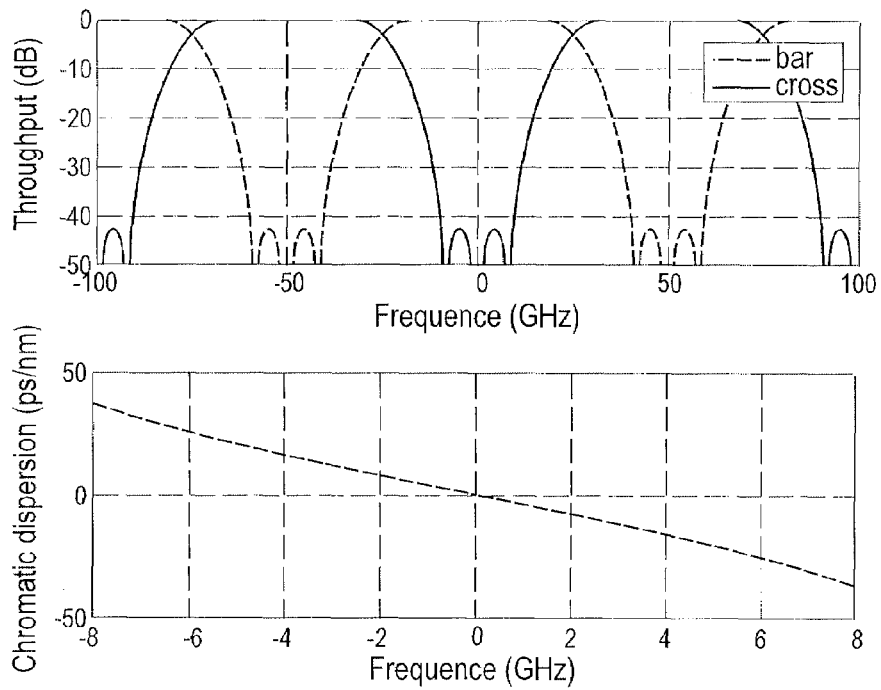
FIG. 3A is a diagram and optical response of a typical 50/100 GHz IIR filter.
Figure 3B:
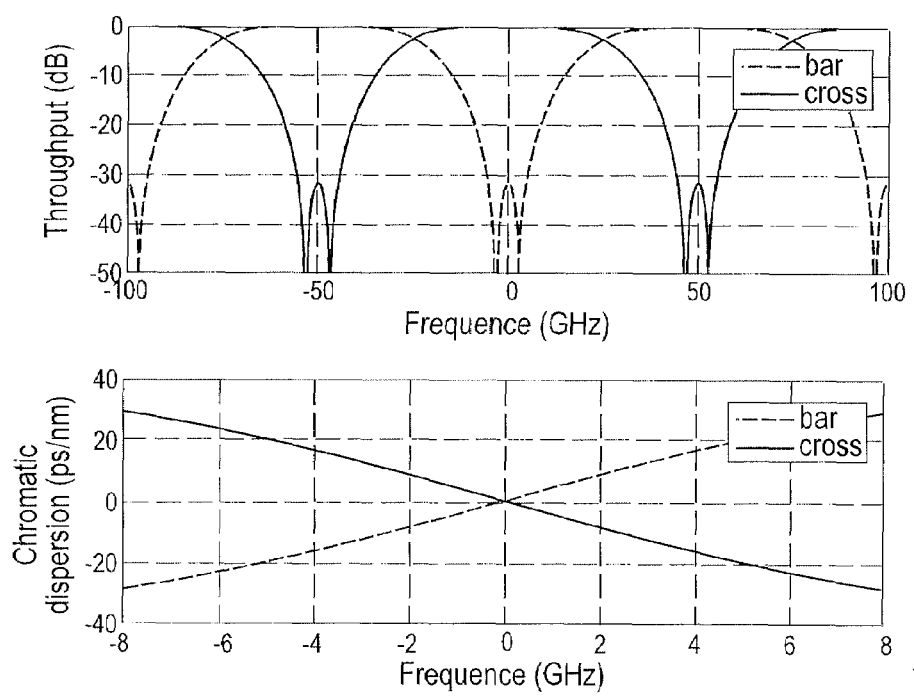
FIG. 3B is a diagram and optical response of a typical 50/100 GHz FIR filter.

Thus, the present invention preferably combines desired characteristics of the IIR filter 26 with the FIR filter 28 to minimize chromatic dispersion in the resulting multiplexed signal 14. For example, FIG. 3A illustrates the response of the IIR filter 26 as a typical 50/100 GHZ filter, and FIG. 3B illustrates the response of the FIR filter 28 as a typical 50/100 GHZ filter 20. FIG. 3A demonstrates that optical signals 12 input solely in the IIR filter 26 produce multiplexed signals 14 having negative-sloped chromatic dispersion of ps/nm over a set frequency. In order to compensate for the negative-sloped chromatic dispersion, while retaining the benefits of the use of the IIR filter 26 such as the high extinction ratio and wide bandwidth evidenced in the response diagram, the FIR filter 28 in FIG. 3B is designed to produce chromatic dispersion of the opposing sign to the IIR filter 26, the response of which is illustrated in FIG. 3B, such that the opposing chromatic dispersion of the FIR filter 28 counteracts or effectively cancels at least a portion of the chromatic dispersion of the IIR filter 26. Thus, placing the IIR filter 26 and the countering FIR filter 28 in communication within the periodic optical filter 10 produces multiplexed signals 14 having minimal chromatic dispersion, while retaining generally desired characteristics for the resulting multiplexed signal 14.

Figure 4:
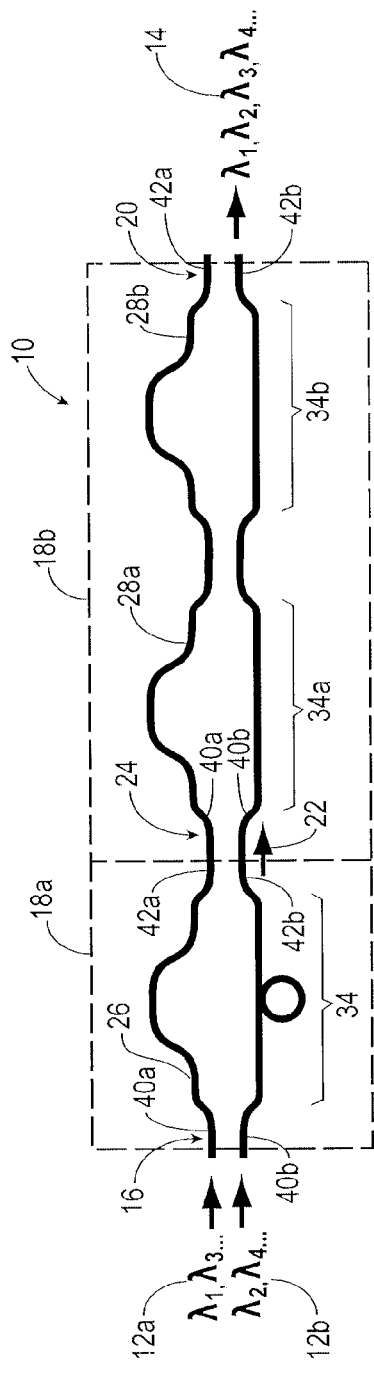
FIG. 4 is a schematic diagram of one embodiment of the periodic optical filter for interleaving optical signals to provide multiplexed signals in accordance with the present invention.

Referring to FIG. 4, illustrated is a schematic diagram of one embodiment of the periodic optical filter 10 for interleaving the plurality of optical signals 12a and 12b to provide the multiplexed signal 14 for transmission over the optical fiber. The periodic optical filter 10 in FIG. 4 is a periodic filter 10 comprising two optical filters 18a and 18b. Although the embodiment illustrates the use of two optical filters 18a and 18b, it will be apparent to one skilled in the art that additional optical filters 18 may be provided based on use of the device and simplicity of design characteristics without deterring from the present invention.

Optical filter 18a receives the two optical signals 12a and 12b through the input port 16, performs the first filtering function, and outputs the filtered optical signal 22. The optical filter 18a illustrated in FIG. 4 includes the IIR filter 26. The IIR filter 26 includes input ports 40a and 40b forming the input port 16 of the periodic optical filter for receiving the optical signals 12a and 12b. The optical signals 12a and 12b are filtered through the interferometric unit cell 34 of the IIR filter 26 to provide the filtered optical signal 22. The filtered optical signal 22 is output through output ports 42a and 42b of the IIR filter 26 and transmitted to optical filter 18b. Although FIG. 4 illustrates the use of the optical filter 18a having only one IIR filter 26, it should be appreciated by one skilled in the art that the optical filter 18a may include a chain of serial or parallel connected IIR filters 26.

Optical filter 18b receives the filtered optical signal 22 through the intermediate port 24, performs the second filtering function on the filtered optical signal 22, and provides the multiplexed signal through the output port 20. The optical filter 18b includes two FIR filters 28a and 28b. Input ports 40a and 40b of FIR filter 28a form the intermediate port 24 receiving the filtered optical signal 22. The filtered optical signal 22 is transmitted through the interferometric unit cell 34a of FIR filter 28a and the interferometric unit cell 34b of FIR filter 28b, producing the resulting multiplexed signal 14. Output ports 42a and 42b of the FIR filter 28b form the output port 20 for outputting the multiplexed signal 14 onto a single optical fiber. Although FIG. 4 illustrates the use of the optical filter 18b having two FIR filters 28a and 28b, it should be appreciated by one skilled in the art that the optical filter 18b may include a single FIR filter 28 or a chain of serial or parallel multiple FIR filters 28.

Figure 5:
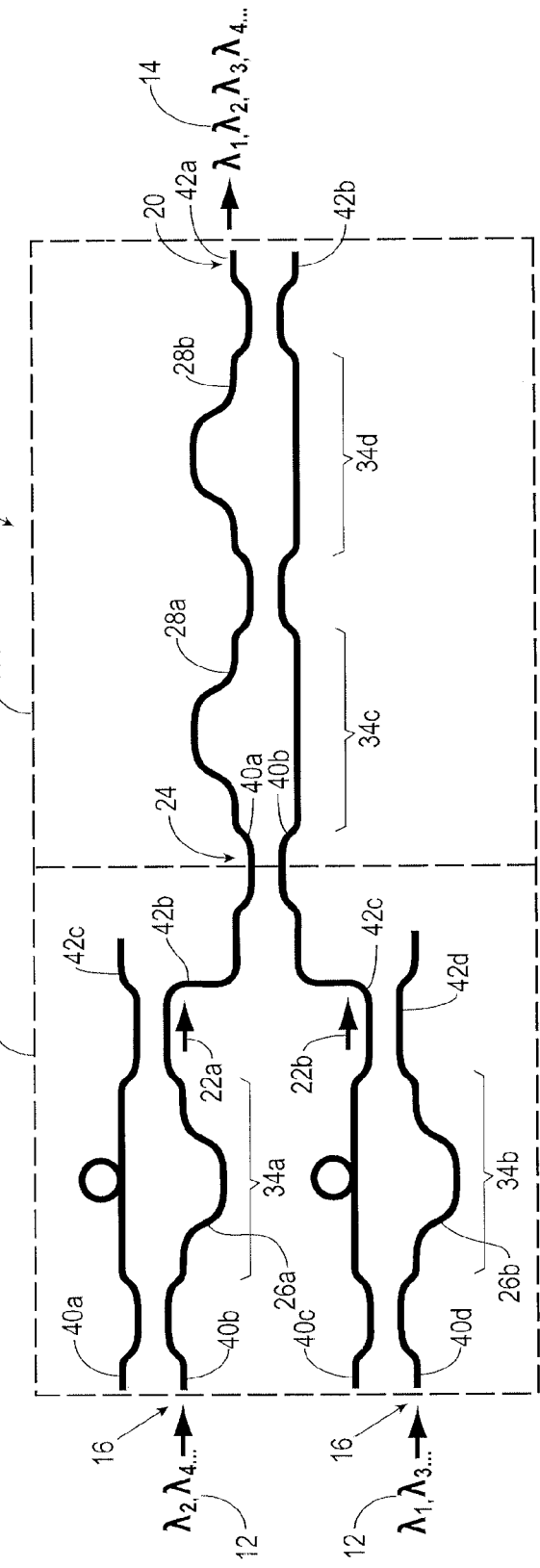
FIG. 5 is a schematic diagram of another embodiment of the periodic optical filter for interleaving optical signals to provide multiplexed signals in accordance with the present invention.

Referring now to FIG. 5, illustrated therein is a schematic diagram of another embodiment of the periodic optical filter 10 having a multi-stage configuration. The periodic optical filter 10 receives optical signals 12 through the input port 16, filters the optical signals 12 using at least two optical filters 18a and 18b, and provides the resulting multiplexed signal 14 through the output port 20.

Optical filter 18a receives the two optical signals 12a and 12b through the input port 16, performs filtering functions, and outputs the filtered optical signals 24 to the multiplexing branch 48. The optical filter 18a illustrated in FIG. 4 includes IIR filters 26a and 26b cascaded in parallel. The IIR filters 26a and 26b include input ports 40a, 40b, 40c and 40d forming the input port 16 of the periodic optical filter for receiving the optical signals 12. In FIG. 5, optical signals 12a and 12b are input into input port 40b and 40d. It should be appreciated that additional optical signals 12 may be provided and input into input port 40a and 40c depending on the needs of the device.

Optical signals 12a and 12b are filtered through the interferometric unit cells 34a and 34b of the IIR filters 26a and 26b to provide filtered optical signals 22a and 22b. The filtered optical signals 22a and 22b are output through output ports 42b and 42c of the IIR filters 26a and 26b and transmitted through the multiplexing branch 48. The multiplexing branch 48 transmits the filtered optical signals 22a and 22b to optical filter 18b.

Optical filter 18b receives the filtered optical signals 22a and 22b through the intermediate port 24, performs the second filtering function on the filtered optical signals 22a and 22b, and provides the multiplexed signal through the output port 20. The optical filter 18b includes two FIR filters 28a and 28b. Input ports 40a and 40b of FIR filter 28a form the intermediate port 24 receiving the filtered optical signals 22a and 22b. The filtered optical signals 22a and 22b are transmitted through the interferometric unit cell 34c of FIR filter 28a and the interferometric unit cell 34d of FIR filter 28b, producing the resulting multiplexed signal 14. Output ports 42a and 42b of the FIR filter 28b form the output port 20 for outputting the multiplexed signal 14 onto a single optical fiber. Although FIG. 5 illustrates the use of the optical filter 18b having two FIR filters 28a and 28b, it should be appreciated by one skilled in the art that the optical filter 18b may include a single FIR filter 28 or a chain of multiple FIR filters 28.

Figure 6:
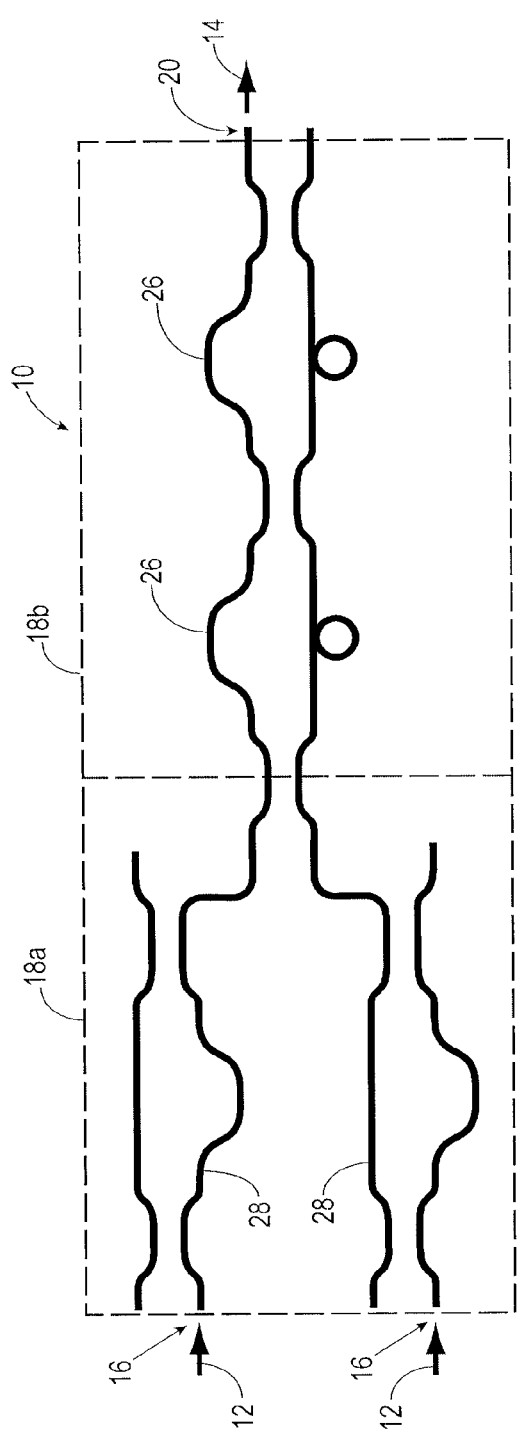
FIG. 6 is a schematic diagram of another embodiment of the periodic optical filter for interleaving optical signals to provide multiplexed signals in accordance with the present invention.

Referring now to FIG. 6, illustrated therein is a schematic diagram of another embodiment of the periodic optical filter 10 having a multi-stage configuration wherein FIR filters 28 comprise optical filter 18a and IIR filters 26 comprise optical filter 18b. The periodic optical filter 10 receives optical signals 12 through the input port 16, filters the optical signals 12 using optical filters 18a and 18b, and provides the resulting multiplexed signal 14 through the output port 20.

Figure 7:
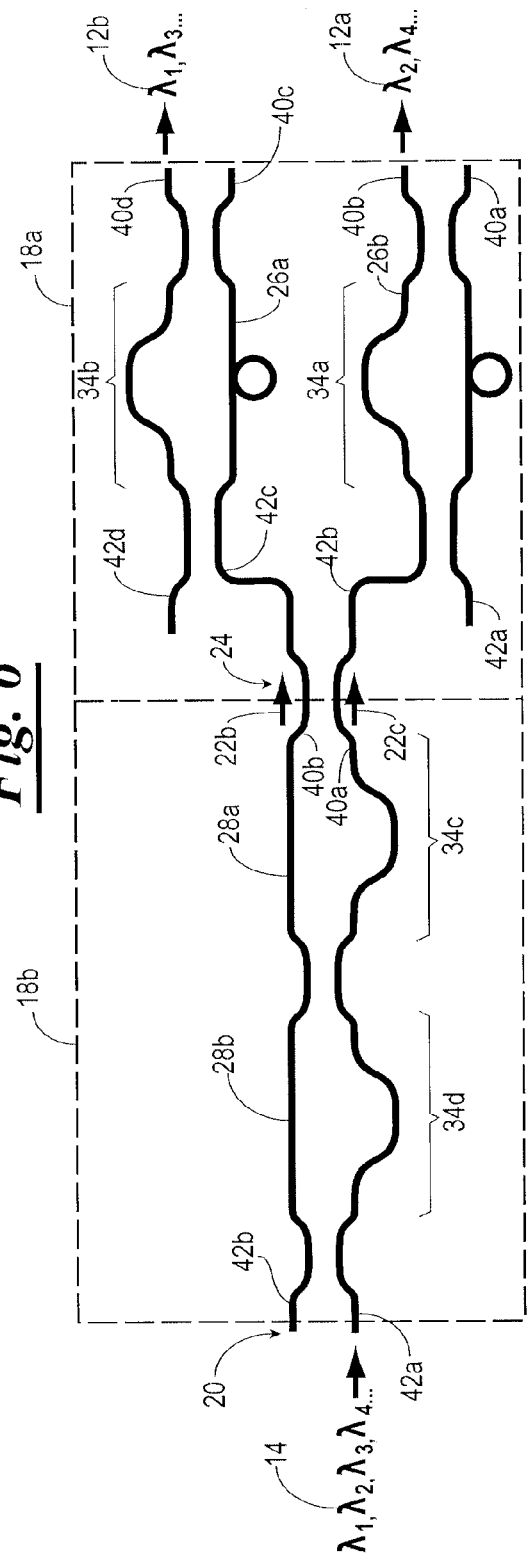
FIG. 7 is a schematic diagram of one embodiment of a periodic optical filter for de-interleaving multiplexed optical signals in accordance with the present invention.

As previously discussed, the periodic optical filter 10 may also be used in the reverse to perform de-interleaving functions on the multiplexed signal 14. For example, FIG. 7 is structurally similar to FIG. 5 and illustrates one such embodiment of the periodic optical filter 10 for de-interleaving the multiplexed signal 14. In this embodiment, the wavelength division multiplexed signal 14 is input into the output port 20 of the optical filter 18b such that the periodic optical filter 10 outputs a plurality of optical signals 12a and 12b for transmission over multiple optical fibers. This reversibility for de-interleaving the multiplexed signal 14 will apply to the embodiments of the present invention. This reversibility for de-interleaving the multiplexed signal 14 applies to structurally similar embodiments of the present invention.

Figure 8A:
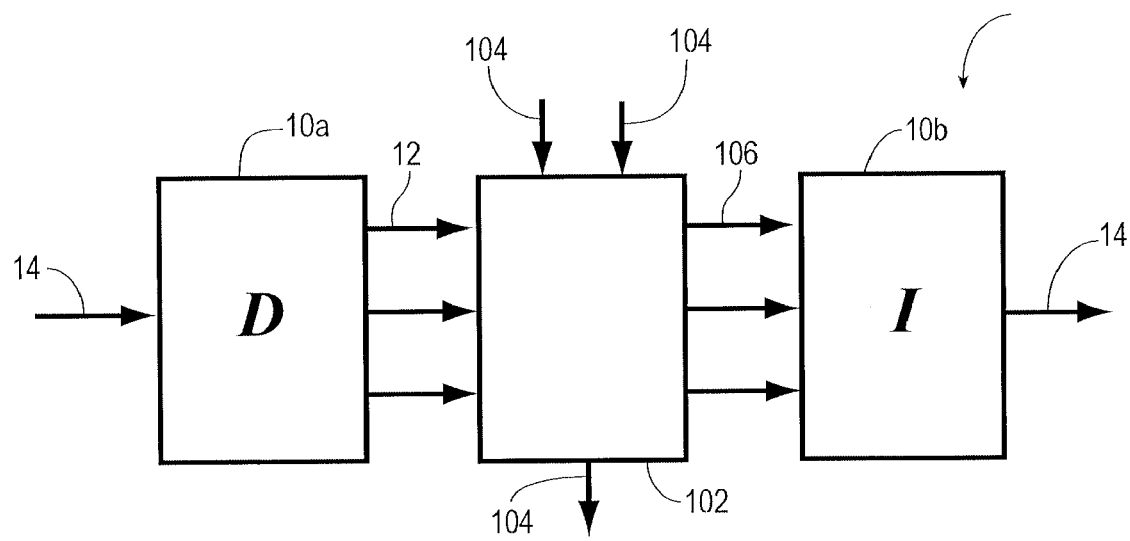
FIG. 8A is a schematic diagram of one embodiment of an add-drop multiplexer including an interleaving periodic optical filter, signal processing system, and a de-interleaving periodic optical filter in accordance with the present invention.
Figure 8B:
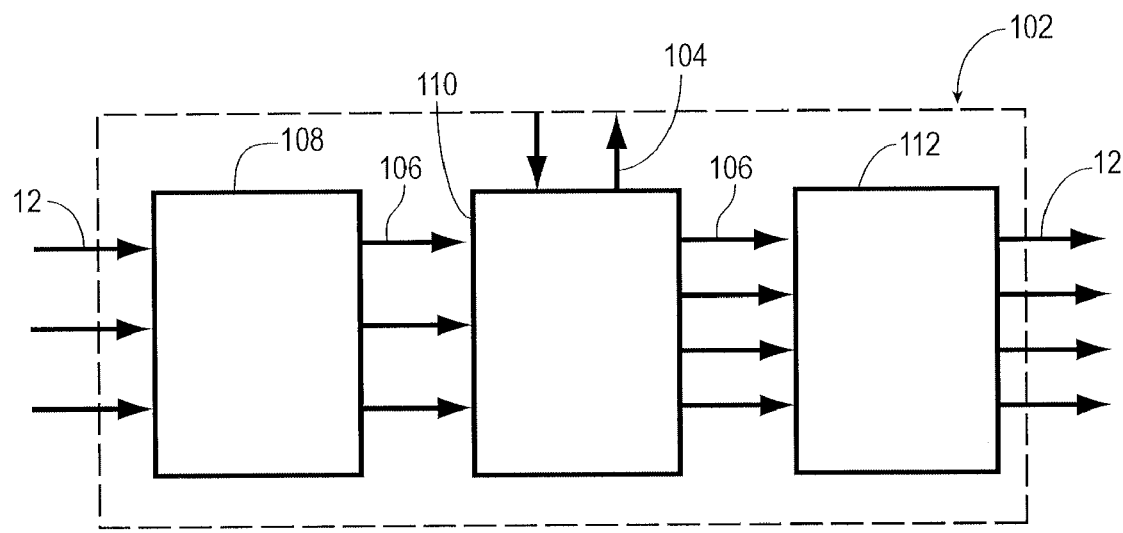
FIG. 8B is a schematic diagram of one version of a signal processing system for use in the add-drop multiplexer of FIG. 8A.

Referring now to FIGS. 8a and FIGS. 8b, shown therein is an add-drop multiplexer 100 providing routing and processing of optical signals 12 into or out of a single mode fiber. In general, the add-drop multiplexer 100 includes periodic optical filters 10a for de-interleaving multiplex signals 14 and periodic optical filters for interleaving optical signals 12 as described herein. Additionally, the add-drop multiplexer 100 includes a signal processing system 102 for reconfiguring paths between the de-interleaving periodic optical filter 10a, the interleaving periodic optical filter 10b, and a plurality of ports 104 for adding and dropping optical signals.

The de-interleaving periodic optical filter 10a separates the wavelength division multiplexed signal 14 into optical signals 12 and outputs the optical signals 12 to the signal processing system 102. The signal processing system 102 receives the optical signals 12 and converts the optical signals 12 into processing signals 104. The signal processing system 104 reconfigures the path of the optical signals 12 by dropping optical signals 12, adding optical signals 12, and/or directing the optical signals 12 to the interleaving periodic optical filter 10b.

Referring to FIG. 8b, shown therein is a schematic block diagram representing one embodiment of the signal processing system 102, Reconfiguration of the optical signals 12 is achieved through converting the optical signals 12 into processing signals 104 using a first conversion processor 108. Mechanisms of conversion include mechanical means, electro-optic effects, magneto-optic effects, and/or the like. Preferably, the signal processing system 102 converts the optical signals into processing signals 104 using electro-optic effects such as through the use of a photodetector. Once the optical signals are converted to processing signals 106 the processing signals are transmitted to at least one reconfiguration processor 110. Reconfiguration processors 110 may add processing signals 106, drop processing signals 106 through the ports. Examples of reconfiguration processors 110 include fiber patch panels, optical switches, and the like. Additionally, other types of reconfiguration processors 110 may be included within the signal processing system 102 for amplification of the processing signals 106, additional filtration of the processing signals 106, and/or the like.

Processing signals 106 that are directly converted back to optical signals 12 and pass to the periodic optical filter 10b are cut-through lightpaths. Processing signals 106 that are added or dropped at the signal processing system 102 are termed added/dropped lightpaths. Processing signals 106, whether they are cut-through lightpaths or added lightpaths, are converted back to optical signals in a second conversion processor 112 and routed to the interleaving periodic optical filter 10b for combining and transmission of the multiplexed signal 14 over a single optical fiber. Alternatively, the signal-processing system 102 can allow the optical signals 12 to be added and dropped from the ports 104 without the need to convert the optical signals 12 on all of the ports 104 to processing signals 104 and back again to optical signals 12.

Figure 9:
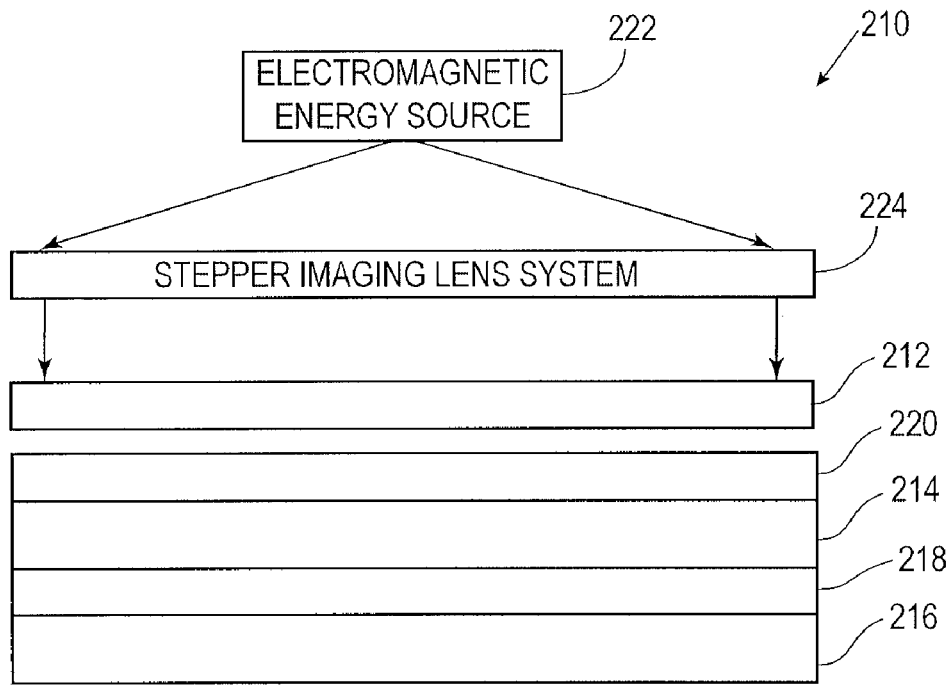
FIG. 9 is a diagrammatic view of an exemplary photolithography system for transferring patterns of a periodic optical filter on a photomask to a thin film optical material on a substrate in accordance with the present invention.

Referring now to FIG. 9, shown therein is an exemplary photolithography system 210 for transferring one or more patterns of periodic optical filters 10 on a photomask 212 to a core material 214 on a substrate 216 in accordance with the present invention. In this embodiment, the core material 214 is a thin film constructed of a material selected from a group consisting of silicon, silicon nitride, silicon oxynitride, silicon oxycarbide, germanium doped silica, Indium Phosphide, Gallium Arsenide, high index polymers, and other material suitable for making optical waveguides including combinations thereof. The core material 214 is deposited on a cladding material 218 constructed of a material having an index of refraction that is lower than the index of refraction of the core material 214. The cladding material 218 can be selected from a group consisting of silica, lower index silicon oxynitride, lower index silicon oxycarbide, Indium Galium Arsenide Phosphide, polymers, and other material suitable for making optical waveguides including combinations thereof. Various examples of combinations of thin film optical materials and claddings suitable (and methods of making same) for forming the core material 214 and cladding material 218 are discussed in U.S. Pat. No. 6,614,977, the entire content of which is hereby incorporated herein by reference.

A photoresist layer 220 is disposed on the core material 214. In general, the photoresist layer 220 is constructed of a material that prevents material beneath the photoresist layer 220 from being removed or material directly underneath the photoresist layer 220 to be removed during a subsequent process for removing predetermined parts of the core material 214, such as an etching process. Thus, the photoresist layer 220 can be either a positive photoresist or a negative photoresist. The present invention will be described herein by way of example as the photoresist layer 220 being a positive photoresist and in side-elevation without showing top plan view of the pattern of the photomask 212 or the periodic optical filter 10. The photoresist layer 220 can be provided on the core material 214 utilizing any suitable process, such as spin coating, for example.

The photolithography system 210 is also provided with an electromagnetic energy source 222 directing energy through a stepper imaging lens system 224 and the photomask 212 to the photoresist layer 220. The electromagnetic energy source 222, such as a high intensity ultraviolet light source or the like, provides electromagnetic energy capable of reacting with the photoresist layer 220 to transfer the pattern on the photomask 212 to the photoresist layer 220.

The stepper imaging lens system 224 receives the electromagnetic energy from the electromagnetic energy source 222 and directs such energy to the photomask 212 which exposes parts of the photoresist layer 220 to the electromagnetic energy. Such exposure can be by any suitable method, such as contact, proximity, and projection.

Figure 10:
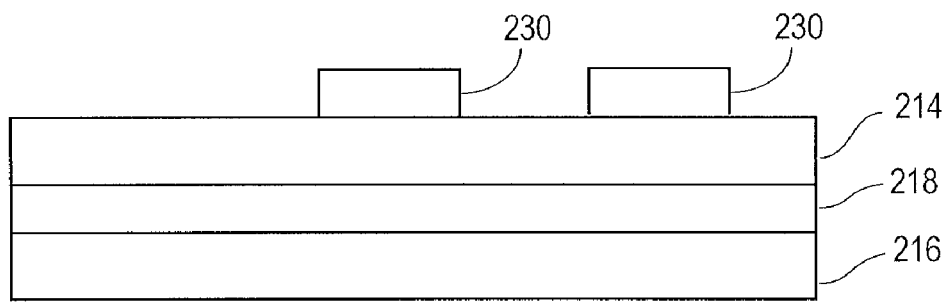
FIG. 10 is a diagrammatic view of an exemplary positive mask of a periodic optical filter formed on the thin film optical material utilizing the photolithography system of FIG. 9.
Figure 11:
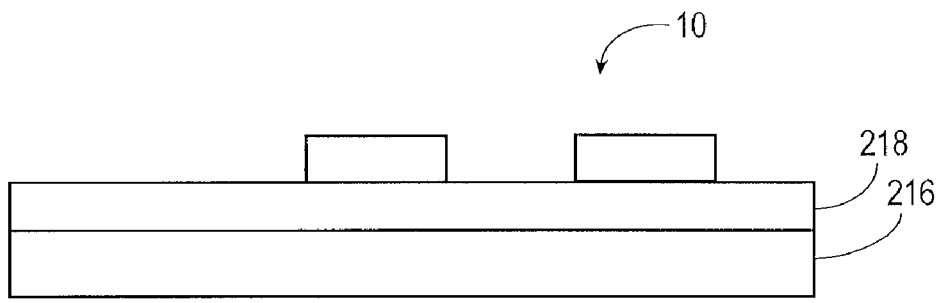
FIG. 11 is a diagrammatic view of a periodic optical filter formed from the thin film optical material using the mask depicted in FIG. 10.

Once the photoresist layer 220 has been exposed, then such photoresist layer 220 is developed to form a mask 230 in the geometry of the periodic optical filter 10 as shown in FIG. 10. Once the mask 230 is formed, then the pattern formed by the mask 30 is transferred into the core material 214 to form the periodic optical filter 10 as shown in FIG. 11. The transferring can be accomplished by any suitable process, such as an etching process. It should be understood that the periodic optical filter forming elements of PLCs referred to herein may be formed using standard or later developed techniques used in the semiconductor industry to deposit and pattern optical waveguide materials, e.g., (dry-etch, wet-etch, flame hydrolysis deposition (FHD), chemical vapor deposition (CVD), reactive ion etching (RIE), physically enhanced CVD (PECVD), or the like. Once the periodic optical filter 10 is formed, the mask 230 is removed, and another layer of cladding material (not shown) can then be deposited over the entire surface and planarized if necessary utilizing any suitable process. For example, a process for applying another layer of cladding material is discussed in U.S. Pat. No. 6,768,828 entitled "Integrated Optical Circuit With Dense Planarized Cladding Layer"; the entire content of which is hereby expressly incorporated herein by reference.

While the above methods for fabricating the periodic optical filter 10 of the present invention are described above in terms of fabricating one periodic optical filter 10, it should be apparent to those skilled in the art that such fabrication methods, as well as any other appropriate fabrication techniques currently known in the art or later developed, can be utilized to fabricate one or more of the periodic filters, or portions thereof.

Computer software code can be utilized to allow a user to construct a virtual representation of the periodic optical filter 10 and/or add-drop multiplexer 100. For example, such a tool can be implemented utilizing Optical Waveguide Mode Suite (OWMS) and Beam propagation solver software available from Apollo Photonics Corp. of Burlington, Ontario, Canada. This software also allows for numeric simulation using a full vector Beam Propagation Method (FV-BPM) (see also, W. P Huang and C. L. Xu, "Simulation of three-dimensional optical waveguides by a full-vector beam propagation method," IEEE J. Selected Topics in Quantum Electronics, vol. 29, pp. 2639-2649, 1993, the entire content of which is hereby incorporated herein by reference.) The FV-BPM takes into account polarization effects including rotation of the optical field.

For example, software code stored on one or more computer readable medium and executed by a suitable processor can be used to provide a user interface to the user (e.g., via a monitor of a computer system) which receives input from the user (e.g., via a keyboard and/or mouse of the computer system). The user can input information into the user interface that defines one or more parameters associated with the intermediate structure or the integrated optical device. The software code can then store the inputted parameters on the one or more computer readable medium and utilize the inputted parameters to generate and display a virtual representation of the intermediate or integrated optical device corresponding to such parameters. Such parameters received from the user can include for example one or more of the following: width, length of shape of the periodic optical filter 10 and/or the add-drop multiplexer 100, or any other geometric feature or property of the periodic optical filter 10 and/or the add-drop multiplexer 100.

As discussed above, in one embodiment, the virtual representation can be used to simulate the geometries and properties associated with the resulting periodic optical filter 10 and/or add-drop multiplexer 100 structure. Further, such a virtual representation can be incorporated into a design application (such as OWMS) which allows the virtual representation to be positioned within a design in combination with other elements to form planar light-wave circuits, such as in the design of chips and/or wafers having a plurality of chips. Such capability allows the periodic optical filer 10 and/or add-drop multiplexer 100 designed by the user (or having predetermined parameters) to be evaluated in combination with other elements in an optical circuit.

As previously discussed, WDM systems allow capacity expansion of a network without having to lay out more optical fibers since capacity of a given link can be expanded by simply upgrading the interleavers and de-interleavers. Contemplated herein is a method for reducing the chromatic dispersion in an optical network system. This method generally includes the step of distributing interleaving and/or de-interleaving periodic optical filters 10 for repair and/or upgrade of the network system. The method includes removing a first interleaving periodic optical filter by disconnecting optical fibers that are transmitting optical signals 12 from the input port 16 of the periodic optical filter 10 and disconnecting optical fibers that are transmitting multiplexed signals 14 from the output port 20. The interleaving periodic optical filter 10 constructed in accordance with the present invention is connected at the input port 16 to optical fibers that are transmitting optical signals 12 and connected at the output port 20 to optical fibers that are transmitting multiplexed signals 14.

In another embodiment, the method includes removing a de-interleaving periodic optical filter by disconnecting optical fibers that are transmitting optical signals 12 from the output port 20 and disconnecting optical fibers that are transmitting multiplexed signals 14 from the input port 16. The de-interleaving periodic optical filter 10 is connected at the output port 20 to optical fibers that are transmitting optical signals 12 and connected at the input port 16 to optical fibers that are transmitting multiplexed signals 14.

It will be understood from the foregoing description that various modifications and changes may be made in the preferred and alternative embodiments of the present invention without departing from its true spirit. Simplicity of design within the description refers to design parameter considerations known within the art and may include financial and practical considerations for use of the device. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An optical interleaver, comprising:
   a first optical filter having a first input port configured to receive first and second optical signals, the first optical filter having a first output that supplies a filtered optical signal; and
   a second optical filter having a second input port configured to receive the filtered optical signal from the first optical filter, the second optical filter having a second output port that supplies a multiplexed signal,
   wherein at least one of the first and second optical filters includes an infinite impulse response (IIR) filter and the other one of the first and second optical filters includes a finite-impulse response (FIR) filter, the first optical filter having an associated first dispersion slope, the first dispersion slope having a sign and a magnitude, the second optical filter having an associated second dispersion slope having a sign opposite the sign of the first dispersion slope, and a magnitude of the second dispersion slope is substantially equal to the magnitude of the first dispersion slope.

2. The periodic filter of claim 1, wherein the first optical filter includes the FIR filter.

3. The periodic filter of claim 1, wherein the second optical filter includes the FIR filter.

4. The periodic filter of claim 2, wherein the FIR filter is a first FIR filter, the first filter further including a second FIR filter cascaded in parallel with the first FIR filter.

5. The periodic optical filter of claim 1, wherein the first optical filter includes the IIR filter, the IIR filter being a first IIR filter, the first optical filter further including a second IIR filter cascaded in parallel with the first IIR filter.

6. The periodic optical filter of claim 5, wherein the first IIR filter includes a first end and a second end and the second IIR filter includes a first end and a second end, the first ends of the first and second IIR filters constitute the first input port of the first optical filter.

7. The periodic optical filter of claim 6, wherein each of the first and second IIR filters includes a first arm and a second arm having different path lengths.

8. The periodic optical filter of claim 7, wherein the first IIR filter includes a resonator optically coupled to one of the first and second arms of the first IIR filter.

9. The periodic optical filter of claim 1, wherein each of the first and second optical signals includes a plurality of multiplexed channels.

10. The periodic optical filter of claim 1, wherein the first optical filter includes the FIR filter, the FIR filter being a first FIR filter, the first optical filter further including a second FIR filter coupled to the first FIR filter.

11. The periodic optical filter of claim 1, wherein the FIR filter is a Mach-Zehnder interferometer.

12. The periodic optical filter of claim 1, wherein the IIR filter is a half-band filter.

13. A periodic optical filter comprising:
    an infinite-impulse response filter having a first end and a second end,
    wherein the first end is an input port receiving an optical signal and the second end is a multiplexing branch to provide a filtered optical signal; and,
    a finite-impulse response filter having a first end and a second end,
    wherein the first end of the finite-impulse response filter is an intermediate port that receives the filtered optical signal from the infinite impulse response filter, and the second end is an output port that provides a multiplexed signal, the infinite-impulse response filter having an associated first dispersion slope, the first dispersion slope having a sign and a magnitude, the finite-impulse response filter having an associated second dispersion slope having a sign opposite the sign of the first dispersion slope, and a magnitude of the second dispersion slope is substantially equal to the magnitude of the first dispersion slope.

14. An optical de-interleaver, comprising:
    a finite-impulse response filter having a first end and a second end, wherein the first end of the finite-impulse response filter is an input port for receiving a multiplexed signal and the second end is an intermediate port for providing filtered optical signals; and
    an infinite-impulse response filter having a first end and a second end, wherein the first end of the infinite-impulse response filter receives the filtered optical signals and the second end of the infinite-impulse response filter is an output port, and the infinite-impulse response filter having an associated first dispersion slope, the first dispersion slope having a sign and a magnitude, the finite-impulse response filter having an associated second dispersion slope having a sign opposite the sign of the first dispersion slope, and a magnitude of the second dispersion slope is substantially equal to the magnitude of the first dispersion slope.

* * * * *